United States Patent [19]

King

[11] 3,935,850

[45] Feb. 3, 1976

[54] VAPOR REGULATING VALVE

[75] Inventor: Jack B. King, Royal Oak, Mich.

[73] Assignee: General Motors Corporation, Detroit, Mich.

[22] Filed: June 12, 1974

[21] Appl. No.: 478,460

[52] U.S. Cl. ........... 123/136; 137/516.13; 251/61.1

[51] Int. Cl.[2] ..................... F02M 59/00; F16K 15/00

[58] Field of Search ................ 123/136; 137/516.13; 251/61.1; 251/29

[56] References Cited

UNITED STATES PATENTS

| | | | |
|---|---|---|---|
| 3,645,244 | 2/1972 | Seyfarth | 123/136 |
| 3,703,165 | 11/1972 | Hansen | 123/136 |
| 3,752,134 | 8/1973 | Hollis | 123/136 |

*Primary Examiner*—Wendell E. Burns
*Assistant Examiner*—Ronald B. Cox
*Attorney, Agent, or Firm*—Robert M. Sigler

[57] ABSTRACT

A vapor regulating valve for use in a system for mixing air with fuel vapor from a fuel tank is constructed so that fuel vapor pressure against a diaphragm actuates a valve to allow engine induction vacuum to be exerted against another diaphragm to actuate a metering valve to accurately mix air and fuel vapor for delivery to the engine intake manifold. The full on-and-off action of the metering valve ensures a consistantly accurate air fuel ratio; and the use of the diaphragms themselves as the moving valve elements results in less expense and greater reliability.

2 Claims, 3 Drawing Figures

VAPOR REGULATING VALVE

SUMMARY OF THE INVENTION

This invention relates to a vapor regulating valve and, in particular, to a vapor regulating valve for use in a system for mixing air with fuel tank vapor in a specific ratio and regulating the flow of the mixture into the intake manifold of an internal combustion engine as a function of fuel tank vapor pressure and engine operation.

It is a common practice, with liquid fueled combustion engines, to retain the vapors given off by the fuel in the fuel reservoir and feed them to the engine induction system for combustion when the engine is operating. Since the nature of combustion engine emissions can be significantly affected by the input air-fuel ratio and this ratio, in turn, can be disturbed by the addition of varying amounts of fuel vapor, metering valves have been suggested to mix air with the fuel vapor in a constant ratio before it is delivered to the engine. Such a valve is shown in the U.S. Pat. No. 3,752,134, issued to Thomas J. Hollis, Jr. on Aug. 14, 1973.

Some low emission engine concepts for the future, however, require that the air-fuel ratio supplied to the engine be maintained within a very narrow range. The metering valve shown in the Hollis patent, with its concentric tubular passages, mixes air and fuel to an exact ratio determined by the opening areas of those tubes when the valve closing member is sufficiently withdrawn from the ends of the tubes. However, when the valve closing member is only slightly open, the fuel flows are constricted in such a way as to distort this normal ratio. Since, in the Hollis valve, the metering valve is opened by fuel vapor pressure, it might be expected that, while the engine is operating, the metering valve will spend the majority of its time in a slightly open position. Of course, very little fuel vapor will be introduced to the engine under such conditions; but it may nevertheless be desirable to increase air-fuel ratio accuracy through the valve.

The valve assembly of my invention routes the flow of fuel vapor through a single valve which is actuated by ported engine induction vacuum in response to a fuel vapor pressure signal. A major result of this design is that this metering valve is almost always driven fully open or fully closed with a resultant increase in air-fuel ratio accuracy.

The confinement of fuel vapor pressure to the small central area of a diaphragm adjacent the central tube of the metering valve ensures that a small spring will be sufficient to keep this valve closed against fuel tank vapor pressure, even in a pressurized fuel tank system, while enabling the metering valve to be more easily opened by ported engine induction vacuum.

My valve assembly design also enables each of the valves therein to be constructed with one simple unmolded diaphragm rather than the two required for each valve in the Hollis valve assembly. Besides making the assembly easier and less expensive to assemble, each of these single diaphragms moves by itself without the necessity of mechanical linkage to another diaphragm; and this improves the reliability of valve operation.

These and other advantages will be more apparent in the diagrams and following description of the preferred embodiment.

DESCRIPTION OF THE PREFERRED EMBODIMENT

Figure 1:
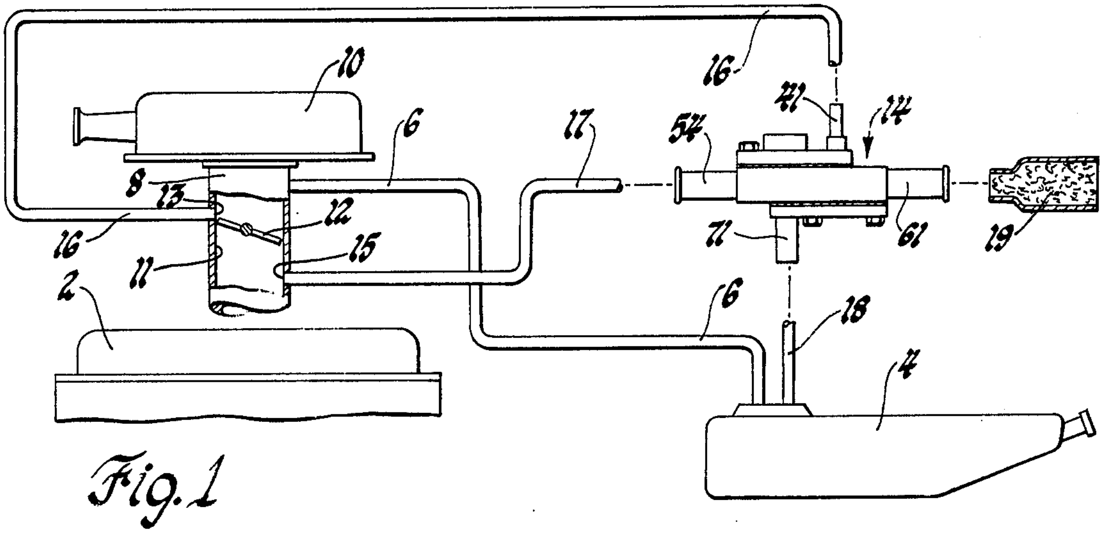
FIG. 1 shows a portion of an engine fuel system including the valve assembly of my invention.

Referring to FIG. 1, an engine 2, which may be vehicle mounted, receives fuel from a reservoir or fuel tank 4. The fuel is pumped by a pump, not shown, through a conduit 6 to a carburetor 8. In the carburetor 8, the fuel is mixed in the desired proportions with atmospheric air from an air cleaner 10; and the resulting air-fuel mixture is drawn past a throttle valve 12 to the engine 2. The preceding is a description of a normal combustion engine fuel induction system. To this system I add vapor regulating valve 14 with suitable conduits for connection to the fuel induction system at appropriate points to be described below.

Figure 2:
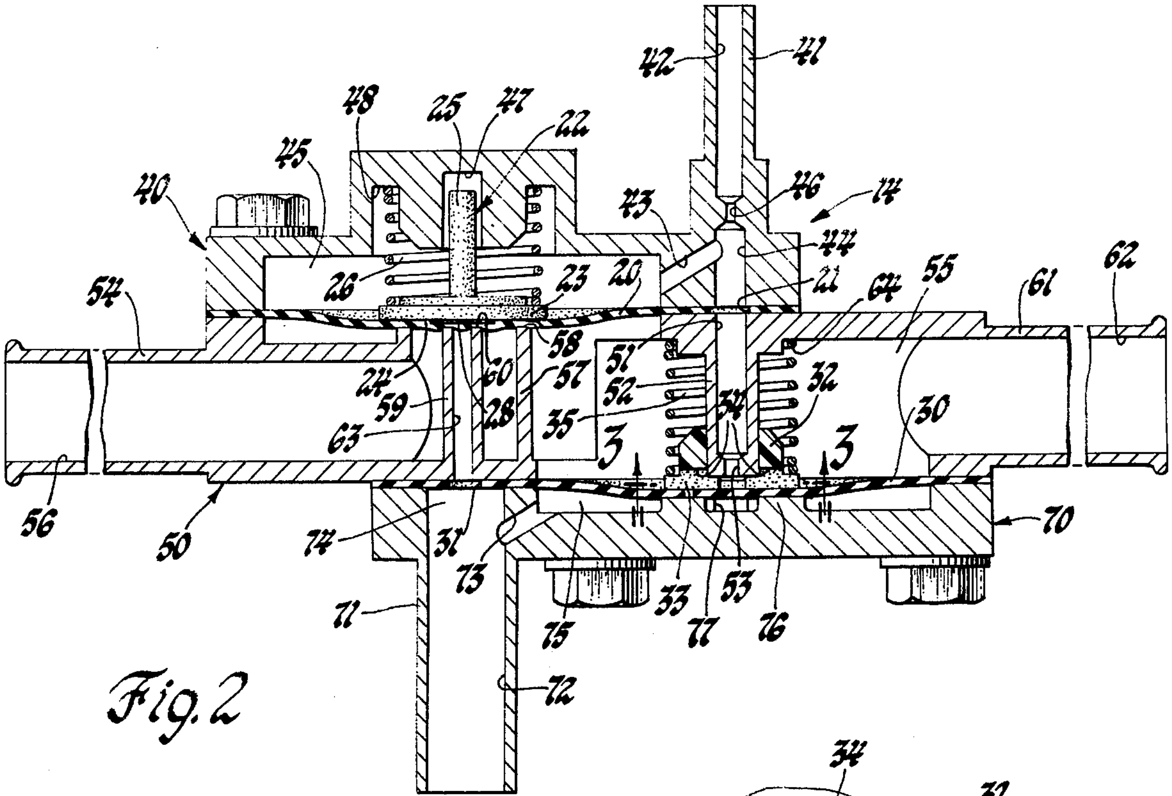
FIG. 2 is a cutaway view of a valve assembly according to my invention.

The vapor regulating valve 14, as shown in more detail in FIG. 2, has a housing comprising a plurality of housing members alternating with a pair of flexible diaphragms. The housing members are bolted together so that the first diaphragm 20 is pressed between the first housing member 40 and the second housing member 50; while the second diaphragm 30 is pressed between the second housing member 50 and the third housing member 70. The diaphragms 20 and 30 divide the interior of the housing into a first chamber 45, bounded by the first diaphragm 20 and first housing member 40, a second chamber 55, bounded by the first diaphragm 20, a second housing member 50 and second diaphragm 30, and a third chamber 75, bounded by the second diaphragm 30 and the third housing member 70.

The first housing member 40 includes an external tube 41 defining a vacuum port 42. A conduit 16, shown in FIG. 1, connects the vacuum port 42 to a ported vacuum port 13 in the carburetor 8 above the throttle valve 12 for communication of induction vacuum within the induction throat 11 to the valve 14 only when throttle 12 opens past ported vacuum port 13. A branch 43 of the vacuum port 42 opens to the first chamber 45. Another branch 44 of the vaccum port 42 extends through the first housing member 40 to meet a bore or vacuum bleed conduit 51 in the second housing member 50, an opening 21 in the flexible diaphragm 20 allowing communication therebetween. The bore 51 is contained within a tube 52 which extends into the second chamber 55 and has an opening 53 at the free end thereof. An orifice 46 is included in the vacuum port 42, a typical diameter therefore being 0.015 inch.

A tube 54 projecting from one end of the second housing member 50 forms an outlet opening 56 which is connected by a conduit 17, shown in FIG. 1, to a manifold vacuum port 15 in carburetor 8 at a point below the throttle valve 12. Tube 54 also opens to another tube 57 in the second housing member 50. The tube 57 is closed at one end and has an open end 58 near the diaphragm 20. The second housing member 50 also forms a smaller diameter tube 59 which has an open end 60 coaxially within the open end 58 of the tube 57. Another tube 61 forms an air inlet 62 by opening the second chamber 55 to the atmosphere. An air cleaner 19 may be fitted to the air inlet 62, as indicated in FIG. 1, to clean the air entering the second chamber 55 of any dirt that might impede operation of the valve.

The third housing member 70 includes a tube 71 defining a fuel vapor inlet 72 which communicates with the fuel tank 4 through a conduit 18. The fuel vapor inlet 72 has one branch 73 which opens to the third chamber 75 and another branch 74 which extends to meet a bore 63 in the tube 59, an opening 31 in diaphragm 30 allowing communication therebetween.

The first housing member 40 has formed in its inner wall, directly opposite and coaxially with the open ends 58 and 60 of tubes 57 and 59, a central well 47 and surrounding annular well 48. A moving valve actuating member 22 comprises a disk 23 having a flat surface 24 of slightly greater diameter than the open end 58 of tube 57 and a guiding shaft 25 projecting perpendicularly from the side of the disk 23 opposite the flat surface 24. Valve actuating member 22 is positioned in the first chamber 45 with surface 24 abutting the diaphragm 20 adjacent tube ends 58 and 60 and guide shaft 25 inserted in central well 47 for alignment. A compressed coil spring 26, with one end anchored in the annular well 48 and the other end abutting disk 23, exerts a bias on the valve actuating member 22 to normally bias diaphragm 20 against tube ends 58 and 60 to close the outlet 56 and branch 74 of the fuel vapor inlet 72. A central circular portion 28 of the disk surface 24, of diameter slightly greater than tube end 60, is raised approximately 0.002 inch to insure a good seal of the diaphragm 20 against tube end 60 for fuel tank vapor gauge pressure up to six pounds per square inch or more. The central circular portion 28 is shown in exaggerated size in FIG. 2.

Figure 3:
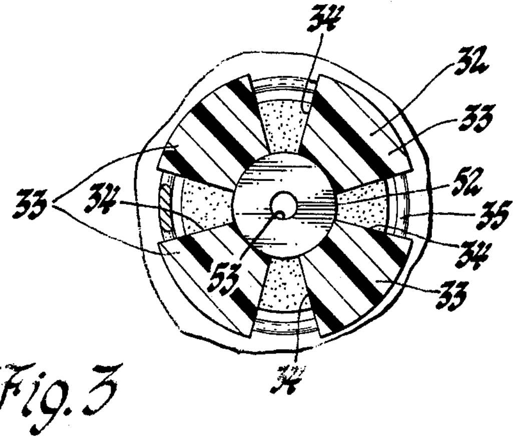
FIG. 3 is a section view along line 3—3.

The third housing member 70 has formed on its inner wall, coaxial with the tube 52, a raised annular portion 76 divided into two segments by a diametral breathing channel 77. A movable valve actuating member 32 of generally annular configuration is positioned to slide on the tube 52 in the second chamber 55. The valve actuating member 32 has, on the side adjacent the diaphragm 30, four diaphragm contacting portions 33 separated by breathing gaps 34, as seen most clearly in FIG. 3. A compressed coil spring 35, with one end against a spring seat 64 in the second housing member 50 and the other end against the valve actuating member 32, exerts a bias on the valve actuating member 32 to bias the diaphragm 30 away from the opening 53 in tube 52 and against the raised annular portion 76.

The operation of the device will now be described. An air-fuel metering valve generally comprises the tubes 57 and 59, diaphragm 20, valve actuating member 22 and spring 26. The metering valve is normally closed, with the spring 26 and valve actuating member 22 biasing the diaphragm 20 against the ends 58 and 60 of tubes 57 and 59. When ported engine vacuum is introduced through vacuum port 42 and branch 43 into the first chamber 45, however, the atmospheric air present in the second chamber exerts a pressure on the underside of diaphragm 20 to move it away from the tubes 57 and 59 until the guiding stem 25 of valve actuating member 22 abuts the first housing member 40. The diaphragm 20 is easily moved by the pressure differential applied to the large area outside tube 57 while it could not be moved by high vapor pressures applied to the small area inside tube 59. Thus the metering valve moves between fully open or fully closed positions.

When open, the metering valve allows air from the second chamber 55 to flow over the end 58 of tube 57 and fuel vapor from the fuel vapor inlet 72 and bore 63 to flow over end 60 of tube 59 into the outlet 56. The fuel-vapor ratio of the resulting mixture is determined by the flow areas of tubes 57 and 59; and those tubes are, of course, designed to produce the desired air-fuel ratio for a particular engine. If the metering valve did not fully open, this ratio would be changed as a result of the restriction to flow between the diaphragm and the ends 58 and 60 of the tubes. However, the fully opening and closing valve assures a constant air-fuel ratio.

A vacuum control valve comprises the tube 52, diaphragm 30, valve actuating member 32 and spring 35. This valve is normally open with the diaphragm 30 pushed away from the end of tube 52 by the spring 35 and valve actuating member 32 so that air from the second chamber 55 is allowed to flow through bore 51 and branch 44 to the vacuum port 42. The orifice 46 restricts the flow of this air to a rate in the neighborhood of a few cubic feet per hour and thus allows the pressure on the upstream side of the orifice 46 to remain essentially atmospheric while the vacuum control valve is open. This pressure is communicated through branch 43 to the first chamber 45, where it helps keep the metering valve closed. The small amount of air introduced to the carburetor through the orifice 46 does not appreciably affect engine operation or emissions.

As the fuel vapor gauge pressure in the third chamber 75 increases, the fuel vapor gauge pressure being the excess of fuel vapor pressure over atmospheric pressure, the diaphragm 30 moves against the force of spring 35 toward the tube 52. A fuel vapor pressure of 0.25 psig is sufficient to move the diaphragm 30 against the end of the tube 52 and thus close the opening 53. If the engine is supplying ported vacuum, the small volume of air within the first chamber 45 and passages 43, 44 and 51 is quickly evacuated, with the result that the metering valve opens.

Thus, fuel vapor and air will be mixed and delivered to the engine induction system only when the engine is supplying ported vacuum and the fuel vapor pressure exceeds 0.25 psig; at all other times the fuel vapor will be kept within the system. Because the metering valve is always fully open or fully closed, the air and fuel vapor will always be mixed in the desired proportion when flow is allowed. Due to the inherent simplicity of the design, only two simple sheet diaphragms are necessary; and no joining is required between either of the diaphragms and any associated actuating members. The great difference in area between the portion of the first diaphragm exposed to fuel vapor pressure and the portion of the opposite side of the diaphragm exposed to ported vacuum allows one small spring to hold the metering valve closed against large fuel vapor pressures but allows the valve to open fully against the same spring when desired.

The ported vacuum port 13 is used in this embodiment to control the flow of fuel vapor and air to the carburetor 8 so that there will be no flow at engine idle, the port 13 seeing no engine vacuum when the throttle 12 closes past it. If the engine is small so that it has a normally small fuel induction rate at idle, the additional flow from the valve 14 could produce an undesirably high idle speed. In large engine, however, this is not a great problem and conduit 16 could be connected along with conduit 17 to the manifold vacuum port 15, which is that presently used for the engine PCV valve.

The vapor recovery valve as described is suitable for use in a fully pressurized enclosed fuel system. If it is not desirable, however, to allow the fuel vapor pressure to increase beyond a certain level, a pressure relief valve could be included in third housing member 70, conduit 18 or tank 4. The pressure relief valve would be designed to open at the critical pressure and admit fuel vapor to a standard carbon canister storage system, which would be exhausted in a normal manner.

It should be noted that the vapor recovery valve as described herein is a preferred embodiment of my invention; and equivalent embodiments will undoubtedly occur to those skilled in the art. Thus my invention should be limited only by the following claims.

I claim:

1. A valve assembly for regulating the flow of fuel vapor and air in a fuel vapor recovery system for a combustion engine including an intake manifold and a fuel reservoir, the valve assembly comprising, in combination:

a valve housing having a fuel vapor inlet with two branches open to the fuel reservoir for admitting fuel vapor therefrom, an air inlet open to the atmosphere for admitting air therefrom, an outlet open to the intake manifold for delivering a controlled mixture of fuel vapor and air thereto, a vacuum port with two branches open through an orifice to the intake manifold for communicating intake vacuum therefrom;

a first diaphragm in the housing, the first diaphragm defining a first chamber open only to one branch of the vacuum port, the first diaphragm being exposed outside the first chamber to the atmosphere and being movable between a first position in which it blocks the outlet and one branch of the fuel vapor inlet and a second position in which it opens the outlet and one branch of the fuel vapor inlet, whereby air from the air inlet and fuel from the fuel vapor inlet are allowed to flow to the outlet;

a second diaphragm in the housing, the second diaphragm defining a second chamber open only to the other branch of the fuel vapor inlet, the second diaphragm being movable between a first position in which it blocks the other branch of the vacuum port and a second position in which it opens the other branch of the vacuum port;

first spring means in the housing, the first spring means being effective to hold the first diaphragm in its first position when engine vacuum is not being communicated through the one branch of the vacuum port;

second spring means in the housing, the second spring means normally being effective to hold the second diaphragm in its second position, whereby atmospheric air is admitted to the vacuum port to prevent the communication of engine vacuum therethrough and the first diaphragm is thereby biased to its first position, the second diaphragm being movable to its first position against the second spring means by a critical fuel vapor gauge pressure, whereupon the position of the first diaphragm is made responsive to the communication of engine vacuum through the vacuum port.

2. A valve assembly for regulating the flow of fuel vapor and air in a fuel vapor recovery system for a combustion engine including an intake manifold and a fuel reservoir, the valve assembly comprising, in combination:

a valve housing having a fuel vapor inlet open to the fuel reservoir for admitting fuel vapor therefrom, an air inlet open to the atmosphere for admitting air therefrom, an outlet open to the intake manifold for delivering a controlled mixture of fuel vapor and air thereto and a ported vacuum port open through an orifice to the intake manifold for communicating ported intake vacuum therefrom;

first and second diaphragms forming three chambers in the housing, the first diaphragm separating a first chamber from a second chamber and the second diaphragm separating the second chamber from a third chamber, the first chamber including the ported vacuum port, the second chamber including the air inlet and the third chamber including the fuel vapor inlet;

a first tube in the valve housing, the first tube having one end open to the second chamber and another end open to the fuel vapor inlet;

a second tube coaxially surrounding the first tube, the second tube having one end adjacent the one end of the first tube open to the second chamber and another end open to the outlet;

first spring means in the first chamber for cooperation with the first diaphragm, first tube and second tube to form a first valve, the first valve having a closed position with the first diaphragm biased by the first spring means against the one end of the first and second tubes to prevent flow therethrough when atmospheric pressure is present in the first chamber and an open position with the first diaphragm pulled away from the one end of the first and second tubes to aalow flow therethrough when ported intake vacuum is present in the first chamber;

a third tube in the valve housing, the third tube having one end open to the second chamber and another end open to the ported vacuum port;

second spring means in the second chamber for cooperation with the second diaphragm and third tube to form a second valve, the second valve having an open position in which the second diaphragm is biased by the second spring means away from the one end of the third tube so that atmospheric pressure is supplied from the second chamber through the third tube to the first chamber and a closed position in which the diaphragm is biased against the one end of the third tube by a critical fuel vapor pressure in the third chamber to prevent flow therethrough so that ported intake vacuum is supplied to the first chamber.

* * * * *

65